United States Patent [19]
Huber

[11] 4,311,914
[45] Jan. 19, 1982

[54] PROCESS FOR ASSESSING THE QUALITY OF A PRINTED PRODUCT

[75] Inventor: Josef A. Huber, Zurich, Switzerland

[73] Assignee: Gretag Aktiengesellschaft, Regensdorf, Switzerland

[21] Appl. No.: 102,418

[22] Filed: Dec. 11, 1979

[30] Foreign Application Priority Data

Dec. 18, 1978 [CH] Switzerland ...................... 12833/78

[51] Int. Cl.[3] ............................................... G06K 5/00
[52] U.S. Cl. ...................................... 250/556; 356/71; 340/146.3 Q
[58] Field of Search ............... 250/555, 556, 566, 567; 340/146.3 H, 146.3 Q, 146.3 S, 146.3 MA; 356/71, 394; 209/534

[56] References Cited

U.S. PATENT DOCUMENTS 3,275,985 9/1966 Dunn et al. .................. 340/146.3 S
4,184,081 1/1980 Bergamini .......................... 250/556

*Primary Examiner*—David C. Nelms
*Assistant Examiner*—Edward P. Westin
*Attorney, Agent, or Firm*—Burns, Doane, Swecker & Mathis

[57] ABSTRACT

The differences between the scanned values of corresponding image points of a specimen and an original are formed by point-by-point scanning and comparison with an original. The difference values are subjected to a tone or shade correction, and then a weighting process and a minimum threshold correction. In the shade or tone correction, a mean value formed from the difference values in a specific surrounding area of the associated image point is subtracted from each difference value. The weighting process is effected individually for each image point and results in systematic errors and critical image zones not producing faulty assessments. The weighting factors are determined by statistical analysis of specimens which are assessed as good visually. The minimum threshold correction eleminates all those pre-treated difference values which are below a certain minimum threshold. The difference values of the points surrounding each image point are added algebraically with distance-dependent weighting to the remaining difference values of each image point. The resulting values are compared with a threshold value for each image point. If these values exceed the threshold value at least at one image point, the specimen is assessed as faulty.

18 Claims, 1 Drawing Figure

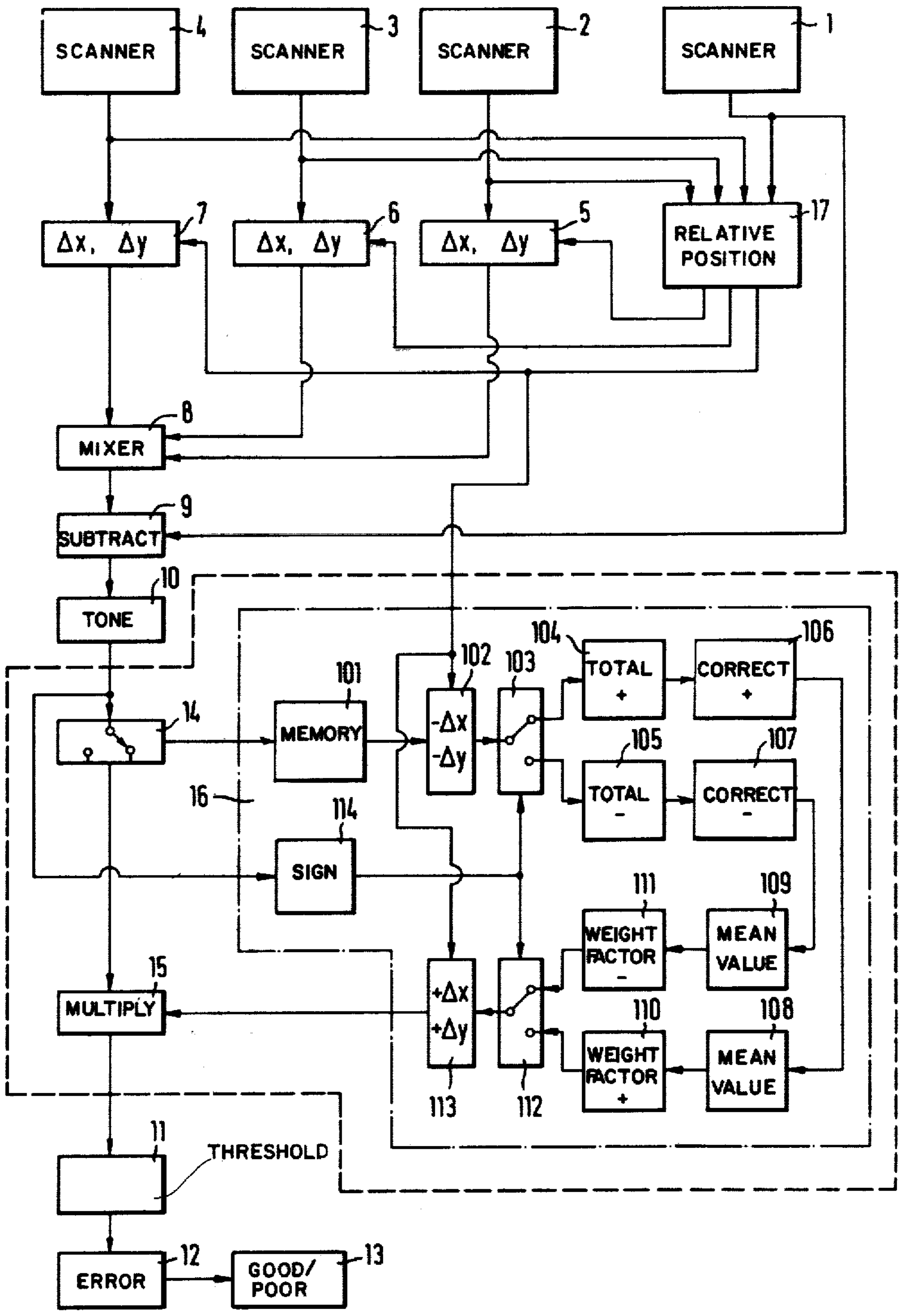
SCANNER
4
SCANNER
3
SCANNER
2
SCANNER
1
Δx, Δy
7
Δx, Δy
6
Δx, Δy
5
RELATIVE POSITION
17
MIXER
8
SUBTRACT
9
TONE
10
14
MEMORY
101
-Δx -Δy
102
103
TOTAL +
104
CORRECT +
106
TOTAL −
105
CORRECT −
107
16
SIGN
114
WEIGHT FACTOR −
111
MEAN VALUE
109
MULTIPLY
15
+Δx +Δy
113
112
WEIGHT FACTOR +
110
MEAN VALUE
108
11
THRESHOLD
ERROR
12
GOOD/ POOR
13

PROCESS FOR ASSESSING THE QUALITY OF A PRINTED PRODUCT

FIELD OF THE INVENTION

This invention relates to a process for assessing the quality of the print of a printed product by point-by-point comparison of the specimen under test and an original, in which values are formed representing the differences between the reflectances of the individual image points of the specimen produced by point-by point photoelectric scanning, and the reflectances of the image points of the original corresponding to the image points of the specimen, and in which the resultant difference values are processed and evaluated in accordance with specific criteria.

PRIOR ART

A process of this kind is described, for example, in U.S. Pat. No. 4,139,779. As will be seen from this publication, one of the difficulties in an automatic assessment process of this kind is to distinguish acceptable faults or errors from unacceptable faults or errors, in order to avoid incorrect assessment of the specimen. For example, in the above patent relatively small differences in the reflectances of the specimen and the original are eliminated by means of a minimum threshold correction so that these small errors are not included in subsequent evaluation. For example, in banknotes there are zones in which even the smallest colour deviations are perceived by the eye as being errors, while on the other hand there are zones, e.g. in the case of the watermark, in which even relatively considerable deviations are considered as acceptable without any difficulty. In this connection, the above patent states that the minimum threshold need not be the same over the entire image area, but may have a higher value locally, e.g. in the area of a watermark. Although this procedure gives very good results, i.e. the frequency of incorrect assessments is relatively low, it has been found that these steps are not adequate in every case.

OBJECT OF THE INVENTION

The object of the invention, accordingly, is to improve a process of the type defined hereinbefore that it will operate more reliably and result in fewer incorrect assessments of the specimens.

SUMMARY OF THE INVENTION

In accordance with this invention therefore we provide a process for assessing the quality of the print of a printed product by point-by-point comparison of the specimen under test and an original, comprising the steps of forming values representing the differences between the reflectances of the individual image points of the specimen produced by point-by-point photoelectric scanning and the reflectances of the image points of the original corresponding to the image points of the specimen; producing individual weights by statistical analysis of a number of printed products which are known to be qualitatively satisfactory, adjusting the weights so that the faultless printed products are also assessed by the process as faultless and allocating respective individual weights to the difference values obtained from each individual image point or from groups of image points.

The term "faultless" in relation to printed products denotes those which have no errors or else just acceptable errors. Suitable faultless printing products are selected by visual examination.

A preferred embodiment of the invention will be explained in detail hereinafter with reference to the drawing, which is a block schematic diagram of apparatus suitable for performing the process.

DETAILED DESCRIPTION OF PREFERRED EMBODIMENT

Except for the parts framed in broken lines, the apparatus illustrated is identical to the apparatus described in U.S. Pat. Nos. 4,131,879, 4,139,779 and 4,143,279. It comprises four devices 1–4 for the point-by-point photoelectric scanning of the specimen and three sub-originals, three shift stages 5,6 and 7 to take into account and compensate for deviations in the relative positions of the specimens and the individual originals, a combination stage 8 for electronically combining the image contents of the three orginals, a subtraction stage 9 in which differences are formed between the reflectances of corresponding points of the image of the specimen and the combined originals, a tone correction stage 10, a minimum threshold correction stage 11, an error evaluating stage 12 operating by the error crest method described in U.S. Pat. No. 4,139,779 and a decision stage 13 which generates a "good" or "poor" signal depending on the assessment of the specimen. In addition to these stages, the apparatus comprises a relative position determining stage 17, an (electronic) selector switch 14, a multiplier 15, and an error statistics stage 16, which in turn comprises a store 101, a shift stage 102, a data switch 103, two accumulators 104 and 105, two correction stages 106 and 107, two mean and reciprocal value forming units 108 and 109, two weighting factor stores 110 and 111, a second data switch 112, another shift stage 113 and a sign detector 114.

The four separate scanners 1 to 4 could be replaced by a single scanner and three suitable stores, the individual sub-originals being scanned sequentially and the resulting scanned values being written into the corresponding store accordingly.

Where the printed products are produced by a single printing process, e.g. just by recess or offset printing, only a single original containing the entire image is required. In that case, the apparatus would be reduced by the corresponding number of scanners or stores and and combination stage.

Very high quality printed products, e.g. banknotes and other security-printed papers, are usually produced in a number of passes using different printing techniques (recess printing, letterpress, or offset). In that case, more accurate examination is rendered possible by the use as proposed in U.S. Pat. No. 4,143,279 previously referred to, of a plurality of sub-originals the image content of each corresponding to the printed image content produced by each one of the different printing techniques.

One of the main requirements for this type of examination is that the relative positions of the specimen and the originals should be known with respect to some fixed coordinate system (usually the specimen scanning raster). The reason for this is that in practice it is practically impossible to position the originals and the specimens in the scanner so that the scanned points really do coincide with the respective image points on the specimen and original or originals.

In the position determining system 17 described in greater detail in U.S. Pat. No. 4,131,879 previously referred to, three pairs of relative coordinates Δ x, Δ y are therefore determined between the specimen and the three originals. In the shift stages 5, 6 and 7, the directly determined or stored scanned values of the three originals are then shifted, by the amount corresponding to their associated coordinates Δ x, Δ y, by computation, so that all the image points of all three originals coincide with those of the specimen. The above mentioned U.S. Pat. No. 4,143,279 describes in greater detail how this is effected.

The shifted or position-corrected reflectances of the three sub-originals are then combined in the combination stage 8, simply by multiplication, to give an overall original which in stage 9 is compared point-by-point with the specimen. The reflectance differences $\Delta I_i$ produced by the comparison stage 9 in these conditions form a picture of the difference between the specimen and the combined original. These reflectance differences $\Delta I_i$ are then subjected to tone correction in stage 10, a mean value being formed from the differences of a predetermined surrounding zone of each image point and then subtracted from the difference of the image point. Faulty assessments due to relatively small shade deviations of the specimen are avoided by this shade or tone correction.

The tone-corrected difference values are then fed via switch 14 and multiplier 15 (by means of which they are subjected to a weighting or masking process explained hereinafter), to the minimum threshold correction stage 11 in which all those position shifted and previously tone-corrected difference values which do not exceed a predetermined minimum threshold are eliminated so that they are no longer included in further assessment. The minimum threshold may be the same for all the image points as a result of the masking or weighting of the difference values as explained hereinafter. U.S. Pat. No. 4,139,779 previously referred to gives full details of the tone and minimum threshold correction and also describes in detail the following error crest evaluation stage 12. An important feature of the error crest method is that the difference values of the individual image points are not considered individually in isolation, but always in conjuction with the difference values of the surrounding points, the latter each being given a distance-dependent weighting.

The difference values processed in this way finally give the decision "good" or "poor" in stage 13 by threshold detection.

The weighting factors which are used in the masking stage 15 and by which each individual difference value is multiplied, are located or produced by means of a statistical error analysis of a relatively large number of printed products which are visually assessed as good. The term "good" is used to denote those products which contain no visually detectable errors, or at least errors which are just acceptable. The "good" specimens are then successively compared point-by-point with the test originals provided for subsequent machine examination of the actual objects under test, and any difference values $\Delta I_i$ occurring in these conditions are shade or tone corrected.

The difference values of each specimen are stored image-wise, i.e., on a point-by-point basis corresponding to the relationship of the points to the original image, in the store 101 by way of the switch 14 and are then shifted in the shift stage 102 so that they coincide with the image points of one of the three originals, preferably the one having the most pronounced image structures and hence most at risk error-wise. The shift stage 102 has the same construction as the stages 5 to 7. The magnitude of the shift is equal to but in the opposite direction to that of the stage 7.

The shifted or position-corrected difference values are then stored image-wise separately by sign in the two accumulators 104, and 105 via the data switch 103, which is controlled by the sign detector 114.

These operations are repeated until all the "good" specimens have been processed. The positive and negative difference values over all the specimens are summed for each image point in the accumulators.

After all the "good" specimens have been examined in this way, the accumulators will contain a representation of the reflectance differences summed over all the specimens at each individual image point. These difference totals indicate what areas of the printed product are critical and/or have systematic errors and the areas where acceptable faults occur very frequently and might therefore easily result in the printed product being incorrectly assessed.

According to the invention, these areas are allocated a reduced error sensitivity, i.e., the apparatus is so adjusted that it reacts less strongly to errors in these critical areas that are expressed in the form of reflectance differences. To this end, the individual difference values are multiplied by an individual weighting factor in stage 15, the weighting factors being smaller for image points having a relatively high statistical error and being higher for image points having a smaller statistical error.

To produce the weighting factors, the positive and negative total values in the accumulators and each associated with an image point are first subjected to correction in stages 106 and 107 and then in stages 108 and 109 they are averaged and the reciprocal values are formed from the average values. These reciprocal values are again stored image-wise separately by sign in the mask stores 110 and 111.

The reciprocal values are now used directly as weighting factors. It will readily be seen that all the weighting factors in the stores form an error mask as it were (for positive and negative difference values in each case), and this error mask is then superimposed on the specimen error image represented by the difference values.

Correction of the total values from the accumulators is effected by adding to the associated total value for each image point the total values of the surrounding image points with a distance-dependent weighting. It may be sufficient to choose the weighting profile so steeply that only a small number of neighbouring points are taken into account. In this correction, the peaks of the error image represented by the individual total values are flattened somewhat and the weighting factors or error sensitivity of the apparatus are not varied too abruptly from one image point to the next.

Of course there is no need for the correction stages 106 and 107 and the mean/reciprocal forming units 108 and 109 to be duplicated. Just one of each is sufficient, in which case the contents of the accumulators will have to be processed sequentially. All the electronic parts of the apparatus other than those concerned with purely analog areas, are advantageously embodied, not by hardware, but by a suitably programmed electronic computer.

Weighting of the (tone-corrected) difference values during machine testing of the actual objects under test is effected as follows:

Depending upon the sign of the difference value, the weighting factor associated with the image point concerned is called out of one or other of the mask stores 110 and 111 for each difference value via the data switch 112 controlled by the sign detector 114, and is multiplied by the associated difference value in the multiplier 15. Since, however, the weighting factors coincide in the mask stores 110 and 111 with the image points of the sub-original scanned (or stored) in stage 4, the individual weighting factors must first be shifted and position-corrected respectively in the same sense and by the same amount as the reflectances of that sub-original. This is effected in the shift stage 113, which is controlled synchronously with the shift stage 7 for the sub-original and the scanner 4 via the relative position determining stage 17.

As a result of the above-described special choice (reciprocal mean) of the weighting factors, the mean error in the "good" specimens is the same over the entire image area. Of course a different choice would be possible, the only important point being that the weighting factors are reduced with increasing mean error at the image point in question. Also, although it is advantageous it is not absolutely necessary to allocate each image point its own weighting factor. A smaller or larger number of image points could be combined to form zones or groups and be given a common weighting factor. The number n of "good" specimens required for determining the weighting factors depends on how accurately the statistical analysis is to be carried out. Usable figures are 100 to 500.

In the above-described embodiment, a separate error mask is used for each of the positive and negative reflectance differences. Alternatively however, a single error mask could be used for example. In that case, instead of the errors or difference values associated with their signs, only their absolute amounts would have to be summed and averaged. Alternatively, although the difference values could be accumulated separately by sign and averaged, just the larger of the two positions and negative mean values in absolute terms could be used to form the weighting factors.

As already stated, apart from stage 16, all the stages of the apparatus are described in greater detail in the aforementioned three U.S. Pat. Nos. 4,131,879, 4,139,779 and 4,143,279. These patents also explain general photo-electric scanning problems in the machine quality control of printed products and suitable methods and apparatus for the purpose. The contents of these patents are hereby incorporated by reference and are expressly part of this specification so that no further explanation of the apparatus is necessary to those versed in the art.

I claim:

1. A process for assessing the quality of the print of a printed product by point-by-point comparison of the specimen under test and an original comprising the steps of forming values representing the differences between the reflectances of the individual image points of the specimen produced by point-by-point photoelectric scanning and the reflectances of the image points of the original corresponding to the image points of the specimen; producing individual weights by statistical analysis of a number of printed products which are known to be qualitatively satisfactory, adjusting the weights so that the faultless printed products are also assessed by the process as faultless, and allocating respective individual weights to the difference values obtained from each individual image point or from groups of image points.

2. A process according to claim 1, including summing the reflectance differences for each image point with respect to the original over the number of printed products, and reducing the weighting factors with increasing total value of the reflectance differences at the associated image point.

3. A process according to claim 2, including using an individual weighting factor for each image point.

4. A process according to claim 2, including selecting the weighting factors to be inversely proportional to the sum of the reflectance differences at the associated image points.

5. A process according to claim 2, including carrying out a tone correction before the weighting process by forming a mean value from the difference values at the individual image points and subtracting them from the individual difference values.

6. A process according to claim 5, including forming from the difference values of predetermined surrounding points of an associated image point a separate mean value for each such image point and subtracting the separate mean value from the difference value of the associated image point.

7. A process according to claim 6, including subjecting the reflectance differences between the printed products known to be qualitatively satisfactory and the original which are formed for determining the weighting factors to a corresponding tone correction.

8. A process according to claim 7, including subjecting the difference values to a minimum threshold correction after the weighting process to eliminate difference values not exceeding a minimum threshold so that they are not included in further processing and assessment.

9. A process according to claim 8, wherein the minimum threshold is the same for all the image points.

10. A process according to claim 2, including summing separately by sign the reflectance differences and forming two weighting factors for each individual image point corresponding to the two totals over the positive and negative reflectance differences, wherein the positive difference values are weighted with one weighting factor and the negative difference values are weighted with the other weighting factor.

11. A process according to claim 10, including adding with distance-dependent weighting the total values of the surrounding image points to the total value of each image point and correcting the totals of the reflectance differences over the total number of the printed products known to be satisfactory.

12. A process according to claim 11, including the steps of directly allocating the weighting factors to the image points of the sub-original among a number of sub-originals whose image content is most pronounced and most liable to contain error.

13. A process according to claim 2, including subjecting the difference values to a minimum threshold correction after the weighting process to eliminate difference values not exceeding a minimum threshold so that they are not included in further processing and assessment.

14. A process according to claim 13, including adding with distance-dependent weighting the total values of the surrounding image points to the total value of each image point and correcting the totals of the reflectance differences over the total number of the printed products known to be satisfactory.

15. A process according to claim 1, including the steps of averaging the reflectance differences for each image point with respect to the original over the number of printed products, and reducing the weighting factors with the average value of the reflectance differences at the associated image point.

16. A process according to claim 15, including using an individual weighting factor for each image point.

17. A process according to claim 15, including selecting the weighting factors to be inversely proportional to the average value of the reflectance differences at the associated image points.

18. A process according to claim 15, including the steps of averaging the reflectance differences and forming two weighting factors for each individual image point corresponding to the two average values over the positive and negative reflectance differences, wherein the positive difference values are weighted with one weighting factor and the negative difference values are weighted with the other weighting factor.

* * * * *